Aug. 19, 1952     J. R. HOLLINS     2,607,840
EMERGENCY STOP FLASHER SIGNAL SYSTEM
Filed April 12, 1949
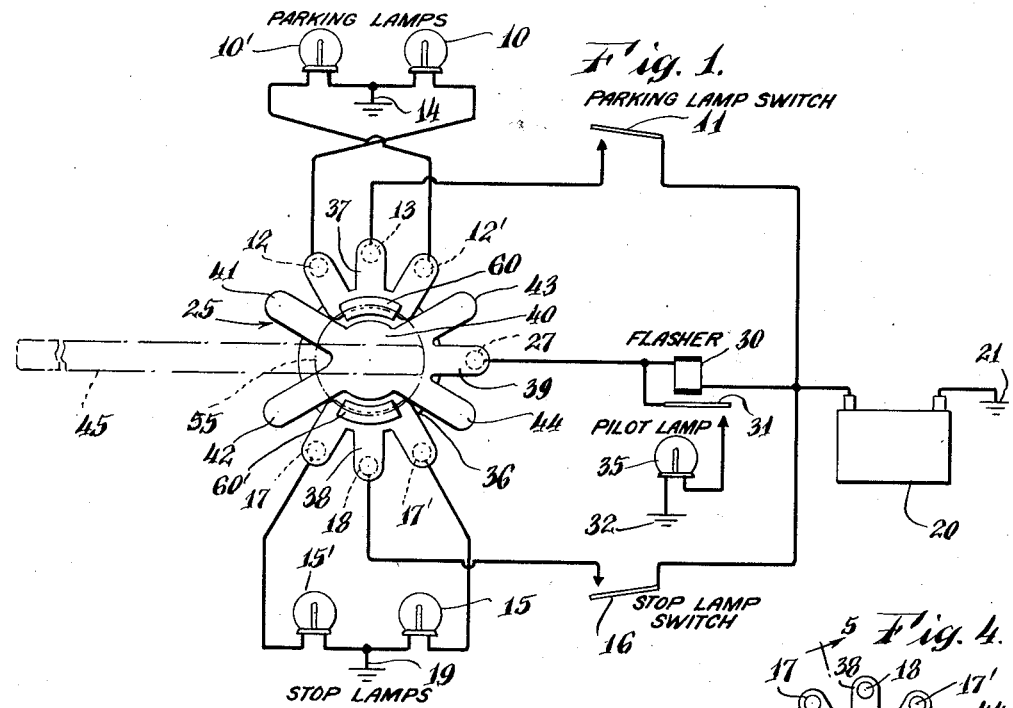
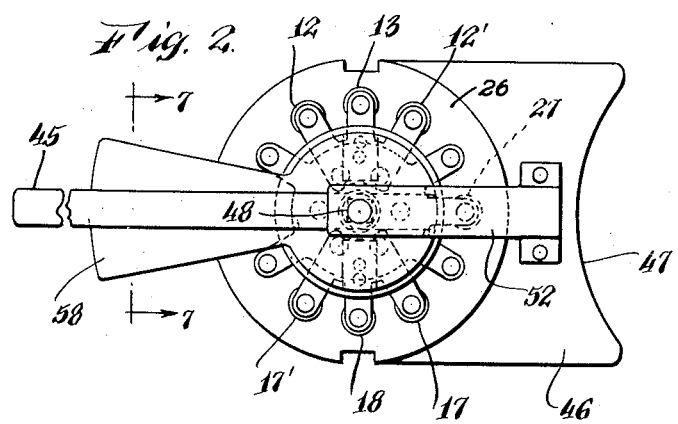
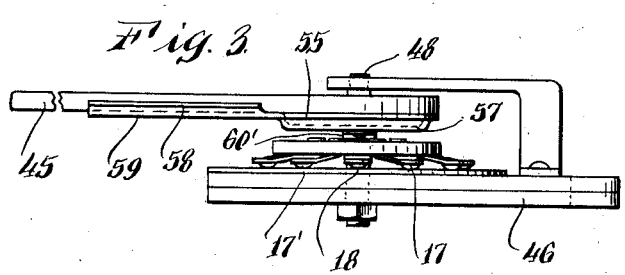
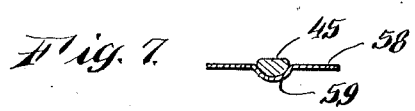
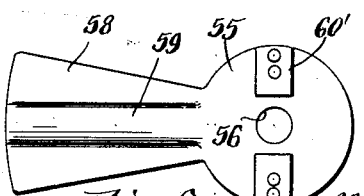

Patented Aug. 19, 1952

2,607,840

UNITED STATES PATENT OFFICE 2,607,840

EMERGENCY STOP FLASHER SIGNAL SYSTEM

Jesse R. Hollins, Brooklyn, N. Y.

Application April 12, 1949, Serial No. 87,010

9 Claims. (Cl. 177—337)

1

This invention relates to vehicle lamp circuits and more particularly to a novel switch and associated circuit elements, whereby vehicle marker lamps may be used as twin indicators or, alternatively, as emergency stop warning signals.

Automotive passenger vehicles and trucks are equipped with parking lamps and stop lamps, the latter usually being activated by a brake actuated switch. In addition, and particularly in the last few years, these vehicles have been equipped with extra lamps operated by a selector switch to indicate turning movement of the vehicle, and are frequently equipped with special "emergency stop" warning lamps. These extra lamps and their control switches add to the expense and complexity of the electric lighting system of the vehicle.

In my copending application, Serial No. 79,878, filed March 5, 1949, now Patent No. 2,562,273, dated July 31, 1951, for "Directional Lamp Switch," I have shown and described a novel switch associated with a flasher unit and a pilot lamp whereby the vehicle parking and/or stop lamps may be selectively "flashed" to indicate a turning movement. The switch includes circuit closure members normally connecting the parking and stop lamp circuits to their respective control circuits. An additional circuit closure member is provided and is arranged normally to be inoperative while being selectively operable by a projecting handle to energize the parking and/or stop lamps on one or the other side of the vehicle through a circuit including a flasher unit. Thereby, either the left-hand or the right-hand parking and/or stop lamps are "flashed" to indicate a turning movement. At the same time, a pilot or indicator lamp within the operator's field of vision is flashed to indicate operation of the directional circuit.

In accordance with the present invention, a further circuit closure or circuit bridge member is provided which is normally engaged with one of the above-mentioned circuit closure members and is disengaged from, or out of contact with, the other mentioned circuit closure member. This bridge member has a releasable, frictional engagement with the switch handle, so that it normally moves with the latter while maintaining its pre-set relation to the mentioned circuit closure members. That is, the bridge member is normally in contact with the circuit closure members connecting the marker lamps to their normal control circuits and is out of contact with the circuit closure member which is selectively operative to connect the marker lamps in the direction circuit.

2

Should the vehicle make an emergency stop, or park along the highway, the bridge member is moved relative to the switch handle and such movement positions the bridge member to electrically interconnect all the switch circuit closure members. Through an added contact on the directional circuit closure members, all the marker lamps are simultaneously connected to be energized through the flasher unit. Thus, all the marker lamps are "flashed" to give warning of the emergency stopped condition of the vehicle.

With the foregoing in mind, it is an object of the present invention to provide a novel emergency stop signalling system for vehicles.

Another object is to provide such a system utilizing conventional vehicle lamp circuits.

A further object is to provide a novel switch and associated circuit elements whereby conventional parking and/or stop lamp circuits may be utilized to provide emergency stop warning signals.

These and other objects, advantages and novel features of the invention will be apparent from the following description and the accompanying drawing. In the drawing:

Fig. 1 is a schematic wiring diagram of vehicle parking and stop lamp circuits embodying the invention;

Fig. 2 is a plan view of a novel switch according to the invention;

Fig. 3 is a side elevation view of the switch;

Fig. 4 is a bottom plan view of the movable direction indicating contact member of the switch;

Fig. 5 is a transverse sectional view on the line 5—5 of Fig. 4;

Fig. 6 is a bottom plan view of the emergency stop signal bridge contact member according to the invention; and Fig. 7 is a transverse sectional view on the line 7—7 of Fig. 2.

Referring to Fig. 1, a vehicle marker lamp arrangement is illustrated as including parking lamps 10, 10' grounded at 14, which may be on the front of the vehicle, a battery 20 grounded at 21, stop lamps 15, 15' grounded at 19, a parking lamp control switch 11, and a brake actuated stop lamp switch 16. Switches 11 and 16 are connected in parallel to battery 20 and, in the present case, are connected to their respective lamp circuits through a novel, selectively operable switch 25.

The latter includes an insulating plate 26 on which are mounted a first set of contacts 12, 12' and 13 and a diametrically opposite set of contacts 17, 17' and 18. A seventh contact 27 is mounted midway between contacts 12 and 17. All of the contacts are arranged equidistant from the center of plate 26, and the distance of contact 27 from contact 12 or 17 is twice the spacing of the contacts of each set of three.

Contacts 12, 12' are connected to parking lamps 10, 10', respectively, commonly grounded at 14. Contact 13 is connected to switch 11. Contacts 17, 17' are connected to stop lamps 15, 15', respectively, and contact 18 is connected to switch 16. Contact 27 is connected to battery 20 through flasher unit 30 which has a movable contact 31 controlling the energization of a pilot or indicator lamp 35 grounded at 32. When flasher 30 is energized, contact 31 intermittently energizes lamp 35, which flashes in synchronism with operation of the flasher.

A second and smaller insulating plate 36 is rotatably mounted on plate 26 and carries diametrically opposite closure members 37, 38, each having three arms arranged, in the position shown in Fig. 1, to engage contacts 12, 12', 13 and 17, 17', 18, respectively. Thus, in the position of Fig. 1, switch 11 is in circuit with both lamps 10, 10' through member 37, and switch 16 is in circuit with both lamps 15, 15' through member 38. Consequently, closure of either switch 11 or 16 will light both of its respective lamps.

Plate 36 carries a second contact closure member 40 having a pair of divergent arms 41, 42 projecting from one side midway between members 37, 38, and three arms 39, 43, 44 projecting from the opposite side. Arm 39 normally engages contact 27. An operating handle or lever is secured to and projects from plate 36 and, when the plate is rotated clockwise one step, arm 41 engages contact 12, arm 43 engages contact 27, and arm 44 engages contact 17'.

Accordingly, lamp 10 is energized over the following circuit: battery 20, flasher unit 30, contact 27, arm 43, member 40, arm 41 and contact 12. Lamp 15 is correspondingly energized through unit 30, arm 44 and contact 17'. Lamps 10, 15 are thus "flashed," while lamps 10', 15' remain steadily lighted. Lamp 35 is likewise "flashed" in synchronism with the flasher unit, as described. A flashing "right turn" signal is thus provided, with operativeness indicated by lamp 35. A corresponding action takes place when lever 45 is moved one step counter-clockwise to signal a "left turn."

In accordance with the invention, a second movable insulating plate 55 is provided carrying diametrically opposite bridge contacts 60, 60'. In a manner described hereinafter, plate 55 is releasably constrained to move with lever 45, but may be moved independently thereof. Contacts 60, 60' normally engage only members 37, 38, respectively, being releasably held in angularly spaced relation to the arms of member 40, irrespective of movement of lever 45 and plate 36.

To indicate an emergency stop, plate 55 is moved in either direction relative to handle 45. This movement causes bridge 60 to electrically interconnect mmebers 40 and 37, and bridge 60' to electrically interconnect members 40 and 38. As one of the arms 39, 43, 44 is in engagement with contact 27 in any of the three switch positions, such movement of plate 55 effects connection of all the lamps to the battery through the flasher unit and through members 40, 37 and 38. Consequently, all the lamps 10, 10', 15, 15' are simultaneously flashed, as well as pilot or indicator lamp 35.

Figs. 2 through 7 illustrate an actual embodiment of switch 25. Contacts 12, 12', 13, 17, 17', 18 and 27 serve as rivets to secure plate 26 to an insulating bracket 46 having an arcuate end 47 to embrace the vehicle steering column. Bracket 46 has a circular aperture forming a bearing for a cylindrical end on a polygonal cross-section shaft 48 fitting mating apertures in plate 36 and handle 45. The opposite cylindrical end of shaft 48 has a bearing fit in a bracket 52 secured to bracket 46. Contact members 37, 38 and 40 are riveted to plate 36, member 40 being separated from members 37, 38 by a dielectric spacer 51.

Plate 55 has bridge members 60, 60' riveted thereto and has a circular aperture 56 fitting loosely around shaft 48. The plate has an upwardly offset surface 57 engaging the inner end of handle 45 and an upwardly offset radial extension 58 alignable with handle 45. Extension 58 is relatively wide, and has a central depression 59 fitting handle 45. Depression 59 serves to releasably lock plate 55 to move with handle 45. Relative movement of plate 55 and handle 45 to provide an emergency stop warning is effected by simply pushing the edge of extension 58 in one direction or the other relative to handle 45.

The arrangement is not limited to parking or stop lamps, but may be used with other conventional lamps such as fog lamps, for example. The circuit arrangement and novel switch are simple and inexpensive.

While a specific embodiment of the invention has been shown and described in detail to illustrate the application of the principles thereto, it should be understood that the invention may be otherwise embodied without departing from such principles.

What is claimed is:

1. A vehicle lamp circuit arrangement comprising, in combination, a pair of electric marker lamps mounted on one each of the left and right sides of the vehicle, a source of electric energy, first switch means normally open and operable to connect both lamps directly to said source, a flasher in circuit with said source, a second switch means selectively operable to connect one lamp of the pair to said source in series circuit relation with said flasher and to connect the other lamp to said first switch means, whereby a flashing turn warning signal is selectively provided, and third switch means selectively operable at any position of said second switch means to simultaneously connect both lamps to said source through said second switch means and said flasher to provide a flashing emergency stop signal.

2. A vehicle lamp circuit arrangement comprising, in combination, a first pair of electric marker lamps one mounted on each of the left and right sides of the vehicle at one end, a second pair of electric marker lamps one mounted on each of the left and right sides of the vehicle at the other end, a source of electric energy, a pair of first switch means each normally open and operable to connect both lamps of one pair directly to said source, a flasher in circuit with said source, a second switch means selectively operable to connect one lamp of each pair to said source in series circuit relation with said flasher and to connect the other lamp of each pair to said first switch means, whereby a flashing turn warning signal is selectively provided, and third switch means selectively operable at any position of said second switch means to simultaneously connect all of said lamps to said source through said second switch means and said flasher to provide a flashing emergency stop signal.

3. A vehicle lamp circuit arrangement comprising a source of electrical energy, a pair of electric marker lamps, a flasher member in circuit with said source, selector switch means having a neutral non-energizing position and two selectively settable energizing positions, said selector switch means, upon being displaced to either of said settable positions connecting one of said marker lamps through said flasher to said source for intermittently energizing the same, and connecting the other of said marker lamps to the source for constantly energizing the same, and a second switch means having a neutral non-connecting and two selectively settable connecting positions, said second switch means, at any position of said selector switch means, upon being displaced to either of said settable positions, connecting both marker lamps through said selector switch and said flasher for intermittently energizing the same.

4. A vehicle lamp circuit arrangement comprising a source of electrical energy, two pairs of electric marker lamps, a flasher member in circuit with said source, selector switch means having a neutral non-energizing position and two selectively settable energizing positions, said selector switch means, upon being displaced at either of said settable positions, connecting one lamp of each pair of marker lamps to said source of energy through said flasher for intermittently energizing and connecting the other lamp of each said pair of marker lamps to said source of energy for constantly energizing the same, and a second switch means having a neutral non-energizing and two selectively settable energizing positions, said second switch means, at any position of said selector switch means, upon being displaced to either of said settable positions, connecting all marker lamps through said selector switch and said flasher for intermittently energizing the same.

5. A vehicle lamp circuit arrangement comprising, in combination, a pair of electric marker lamps one mounted on each side of the vehicle, a source of electric energy, a flasher in circuit with said source, first switch means in circuit with said flasher and conductively connectible between said flasher and said marker lamps, said first switch means being operable to selectively connect one or the other of said lamps through the flasher to the source, whereby said connected lamp intermittently flashes a turn signal, and second switch means conductively connectible between said first switch means and said marker lamps, said second switch means being operable for simultaneously connecting both lamps of the pair through said first switch means and said flasher to said source at any position of said first switch means whereby both marker lamps of the pair intermittently flash an emergency signal.

6. A vehicle lamp circuit arrangement comprising, in combination, a pair of electric marker lamps, one mounted on each side of a vehicle, a source of electric energy, a flasher in circuit with said source, movable first switch means conductively connectible between said flasher and the respective marker lamps of the pair, said first switch means having a neutral non-connecting position and two settable connecting positions, said first switch means, upon displacement to one or the other of its settable positions, being operable to connect one or the other of said marker lamps through the flasher to the source, whereby said connected marker lamp intermittently flashes a turn signal, and movable second switch means conductively connectible between said first switch means and said marker lamps, said second switch means having a neutral non-connecting position and at least one settable connecting position, said second switch means, upon displacement to a settable position, being operable to connect both marker lamps of the pair through said first switch means and said flasher to the source at any position of said first switch means, whereby both marker lamps of the pair intermittently flash an emergency signal.

7. A vehicle lamp circuit arrangement comprising, in combination, a pair of electric marker lamps, one mounted on each side of a vehicle, a source of electric energy, a flasher in circuit with said source, movable first switch means conductively connectible between said flasher and the respective marker lamps of the pair, said first switch means having a neutral non-connecting position and two settable connecting positions, said first switch means, upon displacement to one or the other of its settable positions, being operable to connect one or the other of said marker lamps through the flasher to the source, whereby said connected marker lamp intermittently flashes a turn signal, and movable second switch means conductively connectible between said first switch means and said marker lamps, said second switch means having a neutral non-connecting position and two settable connecting positions, said second switch means, upon displacement to one or the other of its settable positions, being operable to connect both marker lamps of the pair through said first switch means and said flasher to the source at any position of said first switch means, whereby both marker lamps of the pair intermittently flash an emergency signal.

8. A vehicle lamp circuit arrangement comprising, in combination, two pairs of electric marker lamps disposed respectively one fore and one aft of the vehicle, one lamp of each pair mounted on the left and right sides of the vehicle, a source of electric energy, a flasher in circuit with said source, movable first switch means conductively connectible between said flasher and the respective marker lamps of the pair, said first switch means having a neutral non-connecting position and two settable connecting positions, said first switch means being selectively operable, upon displacement to one or the other of its settable positions, to connect those lamps of each lamp pair on one side of the vehicle through the flasher to the source, whereby said thus connected lamp pairs intermittently flash a turn signal and a movable second switch means conductively connectible between said first switch means and said marker lamps, said second switch means having a neutral non-connecting position and at least one connecting position, said second switch means, upon displacement to a settable position, being operable to connect all lamps of said two pairs through said first named switch means and said flasher to the source at any position of said first switch means, whereby all marker lamps intermittently flash an emergency signal.

9. A vehicle lamp circuit arrangement comprising, in combination, two pairs of electric marker lamps disposed respectively one fore and one aft of the vehicle, one lamp of each pair mounted on the left and right sides of the vehicle, a source of electric energy, a flasher in circuit with said source, movable first switch means conductively connectible between said flasher and the respective marker lamps of the pair, said first switch means having a neutral non-connecting position and two settable connecting positions, said first switch means being selectively operable, upon displacement to one or the other of its settable positions, to connect those lamps of each lamp pair on one side of the vehicle through the flasher to the source, whereby said thus connected lamp pairs intermittently flash a turn signal and a movable second switch means conductively connectible between said first switch means and said marker lamps, said second switch means having a neutral non-connecting position and two settable connecting positions, said second switch means, upon displacement to one or the other of its settable positions, being operable to connect all lamps of said two pairs through said first named switch means and said flasher to the source at any position of said first switch means, whereby all marker lamps intermittently flash an emergency signal.

JESSE R. HOLLINS.

REFERENCES CITED

The following references are of record in the file of this patent:

UNITED STATES PATENTS

| Number | Name | Date |
| --- | --- | --- |
| 1,717,629 | Sawyer | June 18, 1928 |
| 2,086,959 | Rom | July 13, 1937 |
| 2,090,332 | O'Neil | Aug. 17, 1937 |
| 2,122,508 | Bell | July 5, 1938 |
| 2,188,451 | Bartens | Jan. 30, 1940 |
| 2,456,498 | Franck | Dec. 14, 1948 |